United States Patent Office 2,869,728
Patented Jan. 20, 1959

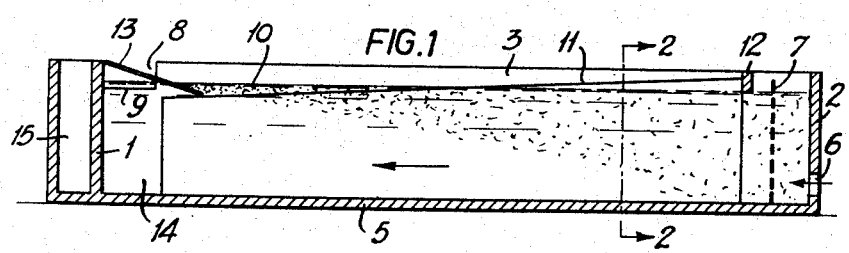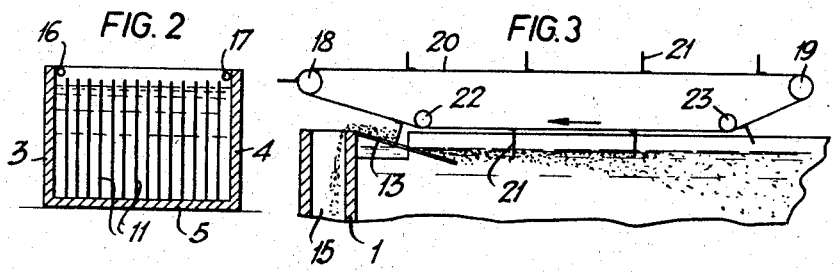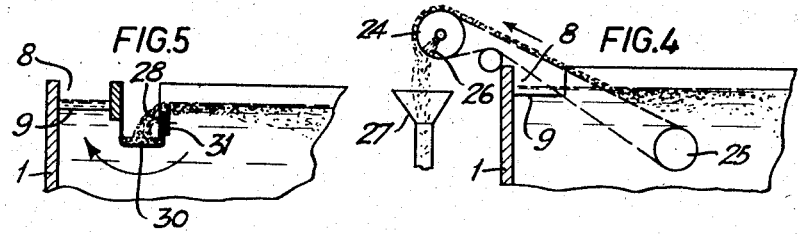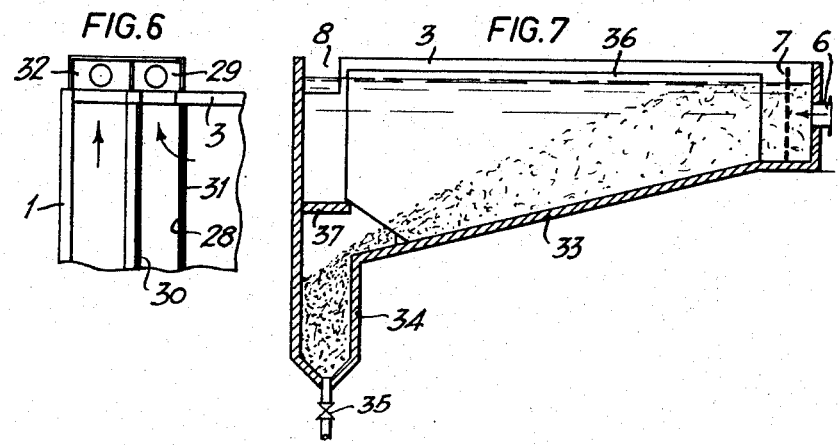

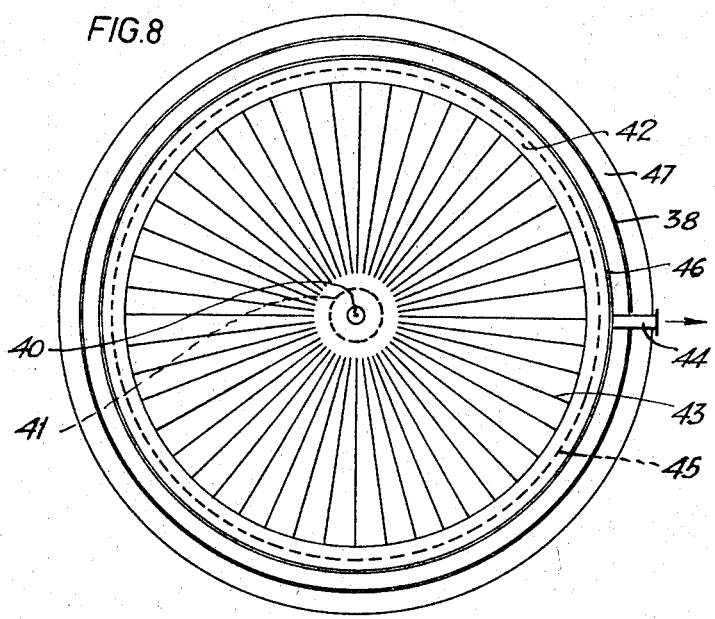
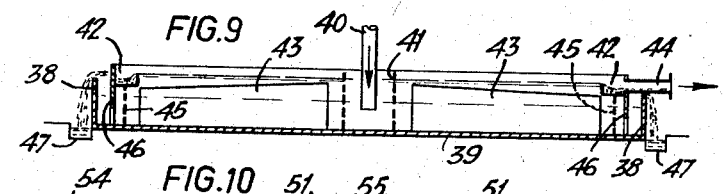
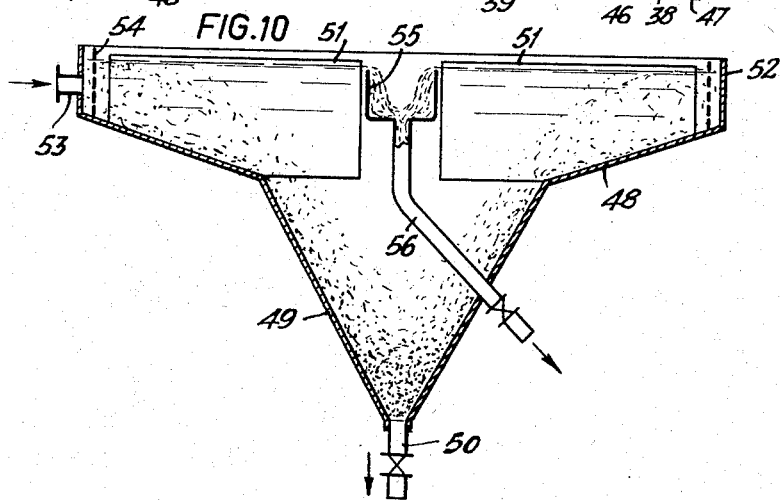

2,869,728

APPARATUS FOR SEPARATING SOLID PARTICLES SUSPENDED IN A LIQUID

Emil Olof Lennart Wallén, Stockholm, Sweden, assignor to Leje & Thurne Aktiebolag, Stockholm, Sweden Application February 20, 1956, Serial No. 566,606

Claims priority, application Sweden March 16, 1955

2 Claims. (Cl. 210—526)

The present invention refers to apparatus for separating solid particles suspended in a liquid, such as particles of a fibrous material, of the type wherein the suspension is caused to flow substantially in a horizontal direction through a separating container under such conditions that the particles are caused to float up to the surface. The output capacity of such apparatus depends on a plurality of cooperating factors. The rising and falling velocity of the particles in the suspension during their passage through the separating container is of a primary importance. To accelerate the separation the suspension is generally subjected to a pretreatment.

The present invention has for its object to increase the output of separating apparatus of the kind in consideration, wherein the suspension is caused to flow continuously, substantially in a horizontal direction, through a stationary separating container. The output or capacity of the apparatus is then understood to be the quantity of suspension flowing per unit of time through the cross section of the liquid. With a certain cross sectional area, the capacity is thus proportional to the velocity of flow. According to the invention, the increase of the capacity is brought about by means built into the separating container proper, such means facilitating an increase of the velocity of flow at the maintenance of a laminary flow, that is to say a flow which is free from turbulence in the whole cross section of the liquid. The invention is principally distinguished by the feature that the liquid space in the separating container is divided into a plurality of lateral passages of a width which is small relatively to the depth thereof, such passages being provided by a number of substantially vertical partitions extending in the direction of flow.

By thus dividing the liquid space into a number of vertical layers of flow screened off against one another, the flow within every layer may be caused to take place without disturbances from adjacent layers. As a consequence of this, the maximum velocity of flow for a laminary flow, that is to say a flow at which a disturbing turbulence is produced, can be considerably increased. With an increased velocity of flow, a correspondingly increased capacity of the apparatus will be obtained.

In an experimental apparatus built according to the invention for the purification of back water from a paper making machine, the separating container had a width of 1 meter and a length of 4.5 meters mutually. The container was provided with 30 partitions arranged at a mutual distance of 35 mm. With a velocity of flow of 3 meters per minute of a laminary flow and a liquid level of 350 mm., the apparatus had a capacity of 1000 liters per minute. A good flotation effect was then obtained with a time of detention for the water in the passages of 1.5 minutes. To provide for a comparison with previously known flotation apparatus, all partitions were removed from the separating container. For the obtention of the same degree of purification, the capacity had then to be reduced to 200 liters per minute. By the use of partitions according to the invention, a capacity five times greater could thus be obtained.

An apparatus according to the invention may also be used for a simultaneous separation of lighter and heavier particles in a combined flotation and sedimentation method, the suspension being then introduced at the inlet side of the separating container, whereas floated material and sediment are taken out through separate outlets in the same container.

Within the scope of the invention, the distance between the partitions may vary, for instance between 10 and 300 mm. Good laminary conditions of flow have been obtained at a distance between the partitions of 35 mm. The level of the liquid in the separating container may also be varied, for instance between 50 and 3000 mm.

The invention will be described more closley with reference to the accompanying drawings, which illustrate various forms of embodiment of the separating container and means for the removal of the product of separation. Fig. 1 shows a vertical longitudinal section through a separating container with a parallelepipedic liquid space. Fig. 2 is a cross section on line 2—2 in Fig. 1. Fig. 3 is a vertical view of a conveying contrivance for the removal of the product of separation in a flotation apparatus. Fig. 4 similarly represents another conveying means for the removal of the product of separation. Fig. 5 is a vertical longitudinal section and Fig. 6 a plan view of the outlet end of a separating container, wherein the product of separation as well as the purified suspension liquid escape over spillways. Fig. 7 is a vertical longitudinal section through a sedimentation container. Fig. 8 is a plan view and Fig. 9 a diametrical vertical section through an annular separating container. Fig. 10 is a diametrical vertical section through another embodiment of an annular separating container.

The separating container shown in Figs. 1 and 2 is provided with two mutually parallel end walls 1, 2, two mutually parallel side walls 3, 4 and a horizontal plane bottom 5. The container, which is open at the top, encloses between said walls a parallelepipedic liquid space, and is provided with an inlet opening 6 in the end wall 2 for the suspension to be purified, which is in this case taken to contain solid particles lighter than water, such as cellulose fibres. Arranged in front of the inlet opening is a distributing screen 7 admitting the suspension therethrough and effecting a uniform distribution of the liquid current over the whole cross section of the liquid. Arranged at the outlet end in both side walls are recesses 8 forming with their lower edges 9 spillways for the purified suspension liquid. In normal operation, a liquid level 10 is maintained which is somewhat higher than the spillway edge 9.

The container is provided with a number of partitions 11 consisting of plane plates set on the bottom of the container in mutually parallel vertical positions, in a manner such as to divide the liquid space into a plurality of longitudinally extending vertical channels of a width which is small relatively to the depth thereof. The distance between the partitions may also be made use of. The partitions are secured with their front end edges in a beam 12 extending between the side walls, and may otherwise be fixed in a firm position relatively to each other by means of supports arranged at the bottom. The partitions are of a height decreasing toward the outlet side and adapted so that the upper edges are at the outlet side at some distance below the level of the liquid, a free liquid space being thus obtained above the partitions, into which space suitable means may be introduced to remove the material of separation floating on the liquid. In the example shown, the material is intended to be removed over a take-up table 13 extending over the whole width of the container and forming a plane which is inclined upwardly toward the wall 1, said plane having its front edge located at some distance underneath the liquid level so as to be capable of catching the material floating up. At the inlet side, the partitions are preferably of a height such that their upper edges project upwardly above the surface 10 of the liquid. The height is preferably also adapted so that the upper edges of the partitions project upwardly above the liquid level along the major portion of the length of the liquid container. The partitions 11 do not extend as far as to the remote end wall 1, but are adapted with respect to their length so that a free liquid space 14 is obtained outside the end edges of the partitions beyond the plate at which the particles floating up to the surface layer are removed from the container. The purified liquid flowing into this space escapes over spillways 8, 9. Arranged outside the end wall 1 is a pocket 15 provided with an outlet to receive the material escaping over the edge of the wall 1. To prevent the material floating up from sticking to the side walls 3, 4, spray pipes 16, 17 are arranged adjacent to the walls above the liquid level, by means of which pipes the walls are sprayed with water.

The removal of the material floating up may be effected in various ways. Fig. 3 shows a conveying means consisting of endless chains 20 running over rollers 18, 19 and having carriers in the form of blades or scrapers 21 arranged thereon. The lower parts of the chains 20 are guided by means of rollers 22, 23 in such manner that the blades 21 project down underneath the liquid level so as to entrain the floating material, which is conveyed further over the take-up table 13 to the pocket 15. Fig. 4 shows another construction of the conveying means, which in this case consists of an endless band or strainer cloth carried over two end rollers 24, 25, one of which is located underneath the liquid level in the container while the other roller is located above the liquid level outside the container and provided with a contrivance 26 to remove the material taken up on the strainer cloth. The upper part of the strainer cloth moves obliquely upwards and rearwards from the outlet point, the material floating up being entrained by the strainer cloth. With the aid of the contrivance 26, which may consist of pipes or nozzles for compressed air or spraying water, the material is taken off the strainer cloth and then falls down into a take-up contrivance 27. Instead of the arrangement shown in Fig. 4, a conveyor can be used in the form of a rotating strainer drum partly immersed into the suspension and adapted to take up the fibres floating up on its side facing the stream of fibres and moving upwardly, the fibres floating up being thus transferred to a place of separation located above the liquid level.

In the arrangement shown in Figs. 5 and 6, the upper surface layer flows with the material floating therein over a spillway 28 down into a transversely extending channel 30 provided with an outlet 29. The spillway is provided with a vertically adjustable bar 31 for the control of the flowing liquid. The purified liquid escapes through spillways 8 arranged in the side walls in a similar way as in Fig. 1, said spillways having outlets 32 connected threeto.

The apparatus shown in Figs. 1 and 2 may also be used to separate solid particles through sedimentation. The bottom 5 may then be provided with one or more longitudinally extending channels located underneath the lower edges of the partitions 11 to collect and lead off the sediment.

The sedimentation container known in Fig. 7 is provided with a plane bottom 33 inclined toward the outlet side, said bottom having a pocket 34 connected thereto, which pocket is provided with an outlet 35 to collect and lead off the product of sedimentation. The partitions 36 rest on the bottom 33 and are supported by a transversely extending beam 37. As in Figs. 1 and 2, they are arranged in mutually parallel positions between the parallel side walls. The suspension flowing in through the inlet 6 passes through the distributing screen 7 and further toward the outlet side, the sediment then sinking to the bottom, while the purified liquid escapes through the spillway 8.

The apparatus shown in Figs. 8 and 9 consists of a cylinder with a vertical wall 38 and a horizontal bottom 39. The upper edge of the wall 38 forms a spillway for the escaping purified liquid. The suspension is supplied through a centrally arranged inlet pipe 40 surrounded by a cylindrical distributing screen 41. Arranged in the space between said screen and an annular outlet channel 42 for the material floating up are radially set partitions 43 dividing the interior of the cylindrical container into a plurality of channels in a manner corresponding to that illustrated in Figs. 1 and 2. The surface layers flow over a spillway into the channel 42 and through the latter to an outlet 44. The purified liquid flows through a distributing screen 45 arranged underneath the channel 42 and through the opening in a sheet-metal cylinder 46 carrying the channel 42, and escapes over the upper edge of the wall 38 to an annular outlet channel 47. In this apparatus, the suspension will flow radially outwards at a continuously decreasing velocity.

An apparatus according to Figs. 8 and 9 may also be used for the separation of solid particles through sedimentation. Fig. 10 shows a cross section of a construction which is suitable for this purpose. In this case the cylindrical container has a conical bottom 48 inclined toward the centre thereof, the central portion of said bottom having the shape of a funnel 49 with an outlet 50. The partitions 51 are arranged on the conical bottom 48. In this case the suspension is supplied through an inlet 53 connected to the outer cylindrical wall 52 of the container and passes first through a cylindrical distributing screen 54 arranged inside said wall and then radially inwards toward the centre of the container, the solid particles then sinking to the bottom, while the purified liquid escapes through a centrally arranged spillway 55 having an outlet conduit 56 connected thereto.

What is claimed is:

1. An apparatus for continuously separating by flotation fibrous material suspended in a liquid comprising, in combination, a stationary separating container adapted to contain a suspension composed of said liquid with said fibrous material suspended therein, an inlet for the suspension in one area of said container, an outlet at an opposite area of said container positioned to establish the upper level of the suspension in said container, whereby said suspension is adapted to flow from said inlet to said outlet with the fibrous material forming a floating layer adjacent said outlet with a lower surface at a second level below said first-named level, a plurality of substantially vertical laterally-spaced partitions dividing the liquid space of the container transversely into a plurality of channels, the upper edges of said partitions adjacent said outlet being at a level below said first-named level but lying substantially adjacent said second level defined by the lower surface of the layer of fibrous material floating on said liquid, whereby said layer is adapted to be forwarded toward said outlet and removed from said liquid without being obstructed by the partitions adjacent said outlet.

2. An apparatus for continuously separating by flotation fibrous material suspended in a liquid comprising, in combination, a stationary separating container adapted to contain a suspension composed of said liquid with said fibrous material suspended therein, an inlet for the suspension in one area of said container, an outlet at an opposite area of said container positioned to establish the upper level of the suspension in said container, whereby said suspension is adapted to flow from said inlet to said outlet with the fibrous material forming a floating layer adjacent said outlet with a lower surface at a second level below said first-named level, a plurality of substantially vertical laterally spaced partitions dividing the liquid space of the container transversely into a plurality of channels, the upper edges of said partitions adjacent said outlet being at a level below said first-named level but lying substantially adjacent said second level defined by the lower surface of the layer of fibrous material floating on said liquid, whereby said layer is adapted to be forwarded toward said outlet and removed from said liquid without being obstructed by the partitions adjacent said outlet, and means adjacent said outlet of the container above said partitions for removing said layer of fibrous material floating on said liquid.

References Cited in the file of this patent
UNITED STATES PATENTS

| | | |
|---|---|---|
| 1,431,367 | Buchi | Oct. 10, 1922 |
| 1,768,215 | Salwen | June 24, 1930 |
| 1,864,511 | Jones | June 21, 1932 |
| 1,967,310 | Kent | July 24, 1934 |
| 2,117,273 | Brown | May 17, 1938 |
| 2,118,157 | Camp | May 24, 1938 |
| 2,124,284 | Boie | July 19, 1938 |